US012608771B2

(12) United States Patent
Zhuang et al.

(10) Patent No.: US 12,608,771 B2
(45) Date of Patent: Apr. 21, 2026

(54) NOISE REDUCTION IN ULTRASOUND IMAGES

(71) Applicant: FUJIFILM SonoSite, Inc., Bothell, WA (US)

(72) Inventors: Bo Zhuang, Redmond, WA (US); Jean Tsou, Seattle, WA (US)

(73) Assignee: FUJIFILM SonoSite, Inc., Bothell, WA (US)

( * ) Notice: Subject to any disclaimer, the term of this patent is extended or adjusted under 35 U.S.C. 154(b) by 407 days.

(21) Appl. No.: 18/318,164

(22) Filed: May 16, 2023

(65) Prior Publication Data

US 2024/0386531 A1 Nov. 21, 2024

(51) Int. Cl.
G06T 5/70 (2024.01)
G06T 3/40 (2006.01)
(Continued)

(52) U.S. Cl.
CPC ................. G06T 5/70 (2024.01); G06T 3/40 (2013.01); G06T 5/50 (2013.01); G06T 5/73 (2024.01);
(Continued)

(58) Field of Classification Search
CPC .... G06T 5/70; G06T 3/40; G06T 5/50; G06T 5/73; G06T 2207/10132; G06T 2207/20081; G06T 2207/20084; G06T 5/60; G06T 7/11; G06T 2207/10081; G06T 2207/30008; G06T 2207/30028;

G06T 2207/30096; G06T 2207/30101; G06T 2207/10036; G06T 7/62; G06T 7/0012; G06T 2207/30044; G06T 3/4046;
(Continued)

(56) References Cited

U.S. PATENT DOCUMENTS 10,426,442 B1 * 10/2019 Schnorr ............... A61B 8/5223
10,646,156 B1 * 5/2020 Schnorr ................. G16H 30/40
(Continued)

FOREIGN PATENT DOCUMENTS

CN 111759345 A * 10/2020 .......... G06F 18/2411
CN 114820952 A * 7/2022 ............. G06T 17/00

*Primary Examiner* — Jose L Couso
(74) *Attorney, Agent, or Firm* — Colby Nipper PLLC

(57) ABSTRACT

Systems and methods for noise reduction in ultrasound images are described. These systems and methods include a noise-reduction system that provides a tensor-based approach that mitigates effects of noise processes on ultrasound images and produces "preprocessed" ultrasound images having consistent characteristics, which increases the accuracy and effectiveness of further processing (e.g., via detection and/or segmentation algorithms) of the ultrasound images. In aspects, these techniques enable neural networks, coupled to the noise-reduction system, to generate consistent inferences across different ultrasound images, thereby enhancing a workflow and user experience of an ultrasound operator. Using these techniques further enables the neural networks to be trained with fewer training images, saving time and monetary costs without sacrificing accuracy. State information of the noise-reduction system, corresponding to when the preprocessed ultrasound images are generated, can also be used to configure the neural networks, resulting in more-efficient operation and resource utilization.

20 Claims, 9 Drawing Sheets

(51) Int. Cl.
  *G06T 5/50* (2006.01)
  *G06T 5/73* (2024.01)
(52) U.S. Cl.
  CPC ............... *G06T 2207/10132* (2013.01); *G06T 2207/20081* (2013.01); *G06T 2207/20084* (2013.01)
(58) Field of Classification Search
  CPC . G06T 9/002; G06T 2207/20076; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06V 10/454; G06V 10/54; G06V 10/764; G06V 10/774; G06V 10/82; G06V 10/84; G06V 20/41; G06V 30/18057; G06V 20/698; G06V 30/19173; G06V 2201/03; G06V 2201/031; G06V 2201/032; G06V 2201/033; G06V 10/806; G06F 18/214; G06F 18/22; G06F 18/241; G06F 18/24; G06F 18/2411; G06F 18/2415; G06F 30/27; Y10S 128/925; A61B 6/52; A61B 8/4477; A61B 8/46; A61B 8/52; A61B 6/5229
  See application file for complete search history.

(56) References Cited

U.S. PATENT DOCUMENTS

| | | | |
|---|---|---|---|
| 2013/0018265 A1* | 1/2013 | Kim | A61B 8/145 600/443 |
| 2018/0157800 A1* | 6/2018 | Ravishankar | G16H 50/50 |
| 2020/0202502 A1* | 6/2020 | Tsymbalenko | G06T 5/60 |
| 2023/0029188 A1* | 1/2023 | Langoju | G06T 7/0012 |

\* cited by examiner

100

300

400

500

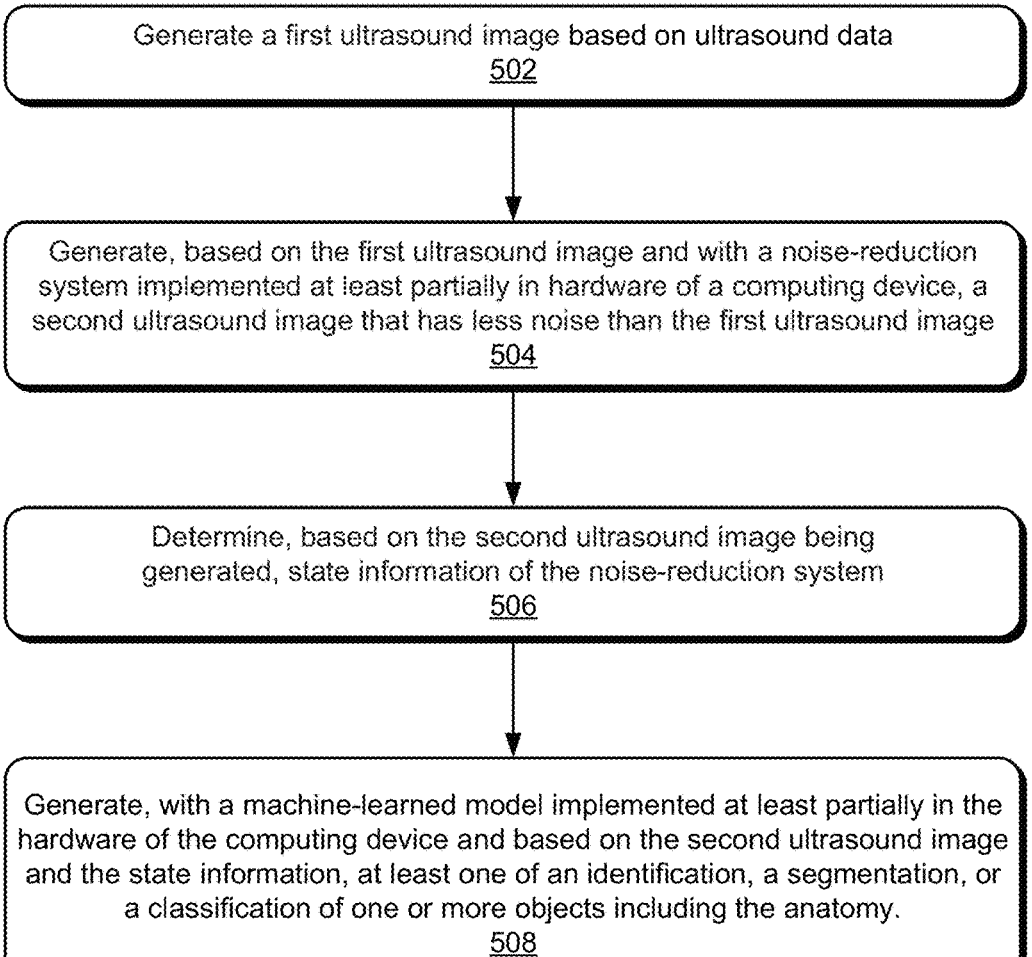

Generate a first ultrasound image based on ultrasound data
502

Generate, based on the first ultrasound image and with a noise-reduction system implemented at least partially in hardware of a computing device, a second ultrasound image that has less noise than the first ultrasound image
504

Determine, based on the second ultrasound image being generated, state information of the noise-reduction system
506

Generate, with a machine-learned model implemented at least partially in the hardware of the computing device and based on the second ultrasound image and the state information, at least one of an identification, a segmentation, or a classification of one or more objects including the anatomy.
508

NOISE REDUCTION IN ULTRASOUND IMAGES

BACKGROUND

Ultrasound systems can generate ultrasound images by transmitting sound waves at frequencies above the audible spectrum into a body, receiving echo signals caused by the sound waves reflecting from internal body parts, and converting the echo signals into electrical signals for image generation. Because they are non-invasive and can provide immediate imaging results, ultrasound systems are used ubiquitously. In many cases, the ultrasound systems perform signal processing on the ultrasound images to assist an operator during an examination. For example, the ultrasound system can implement a detection algorithm to detect blood vessels and classify them as veins or arteries. The classifications can then be viewed by the operator and used to guide a needle insertion. In another example, the ultrasound system segments an anatomy in the ultrasound image, such as segmenting a left ventricle of a heart from the ultrasound image to measure cardiac parameters (e.g., ejection fraction).

However, because the ultrasound images are generated based on reflections of ultrasound signals that are generally low power, the ultrasound images can be noisy (e.g., corrupted by noise processes). The noise can manifest as speckles in the ultrasound images, resulting from the interaction between acoustic wave and tissue structures. For instance, the boundary between tissue structures is often not sharp and lacks contrast. The noise processes, including speckles, can corrupt the ultrasound images to the point that the detection and segmentation algorithms implemented by the ultrasound system can fail. For example, the ultrasound system can misclassify a blood vessel, resulting in repeated insertions of an interventional instrument into a patient. In another example, the ultrasound system can improperly segment an anatomy, resulting in inaccurate biological parameters being generated by the ultrasound system. Accordingly, the patient may not receive the best care possible.

Some conventional solutions that have been developed to improve ultrasound images suffer from image blurring or insufficient speckle suppression. For example, wavelet-based methods generate wormy artifacts and diffusion-based methods do not provide sharp edges. Due to a low signal-to-noise ratio (and speckles) in ultrasound images, compared with computerized tomography (CT) scans and magnetic resonance imaging (MRI), improving ultrasound images remains a challenging work.

SUMMARY

Systems and methods for noise reduction in ultrasound images are disclosed. These systems and methods include a noise-reduction system (e.g., that provides a tensor-based approach) that mitigates effects of noise processes on ultrasound images and produces "preprocessed" ultrasound images having consistent characteristics, which increases the accuracy and effectiveness of further processing (e.g., via detection and/or segmentation algorithms) of the ultrasound images. In aspects, these techniques enable neural networks, coupled to the noise-reduction system, to generate consistent inferences across different ultrasound images, thereby enhancing a workflow and user experience of an ultrasound operator. Using these techniques further enables the neural networks to be trained with fewer training images, saving time and monetary costs without sacrificing accuracy. State information of the noise-reduction system, corresponding to when the preprocessed ultrasound images are generated, can also be used to configure the neural networks, resulting in more-efficient operation and resource utilization compared to conventional systems.

In some aspects, a method is disclosed that includes generating a first ultrasound image based on ultrasound data, the ultrasound data representing reflections of ultrasound signals transmitted by an ultrasound scanner at an anatomy. The method further includes generating, based on the first ultrasound image and by a noise-reduction system implemented at least partially in hardware of a computing device, a second ultrasound image that has less noise than the first ultrasound image. Also, the method includes determining, based on the second ultrasound image generated, state information of the noise-reduction system, the state information representing an internal state of the noise-reduction system. In addition, the method includes generating, with a machine-learned model implemented at least partially in the hardware of the computing device and based on the second ultrasound image and the state information, at least one of an identification, a segmentation, or a classification of one or more objects including the anatomy.

In some aspects, an ultrasound system is disclosed. The ultrasound system includes an ultrasound scanner, one or more processors, a noise-reduction system, and one or more computer-readable media. The ultrasound scanner is configured to generate ultrasound data, the ultrasound data based on reflections of ultrasound signals transmitted by the ultrasound scanner at an anatomy. The one or more processors are configured to generate a first ultrasound image based on the ultrasound data. The noise-reduction system is configured to preprocess the first ultrasound image and generate a preprocessed ultrasound image having reduced noise relative to the first ultrasound image. The one or more computer-readable media have instructions stored thereon that, responsive to execution by the one or more computer processors, implement one or more modules, the one or more modules configured to provide the preprocessed ultrasound image as input to a machine-learned model implemented at least partially in hardware of the ultrasound system and to obtain an output from the machine-learned model, the output including at least one of an identification, a segmentation, or a classification of an object represented in the preprocessed ultrasound image.

Other systems, machines, and methods to provide noise reduction in ultrasound images are also described.

BRIEF DESCRIPTION OF THE DRAWINGS

The appended drawings illustrate examples and are, therefore, exemplary embodiments and not considered to be limiting in scope.

FIG. 5 depicts a method for noise reduction in ultrasound images.

DETAILED DESCRIPTION

Conventional ultrasound systems can generate noisy ultrasound images that when further processed (e.g., via detection and/or segmentation algorithms) result in failures, such as misclassifications of blood vessels, improper anatomy segmentations, etc. Hence, a patient may not receive the best care possible. Accordingly, systems, devices, and methods are disclosed herein that remove or reduce effects of noise processes on ultrasound images, such that when the ultrasound images are further processed, failures are eliminated or reduced compared to conventional ultrasound systems.

Moreover, the systems disclosed herein allow for a level of consistency of neural network operation that is generally not possible with conventional ultrasound systems. For instance, the noise-reduction systems disclosed herein can process noisy ultrasound images that have been corrupted by various noise processes, including even ultrasound images that have been generated with different manufacturers' ultrasound machines and probes, and mitigate the noise processes to produce images with consistent characteristics. Accordingly, the noise-reduction systems can be coupled to one or more neural networks so that the neural networks process ultrasound images that have consistent characteristics (e.g., a consistent level of speckles). Hence, the neural networks can generate consistent inferences, even for ultrasound images that have been generated with different manufacturers' ultrasound machines and probes, or the same probe but from different exams/settings, thereby improving the workflow for the ultrasound operator compared to conventional ultrasound systems. Further, because of the level of consistency of images processed by the noise-reduction system, the neural networks can be trained with fewer training images compared to a neural network not coupled to the noise-reduction system.

In some embodiments, the noise-reduction system provides not just processed ultrasound images to the neural network but also state information of the noise-reduction system (e.g., eigenvalues, distributions, tensor structures, edge locations in different layers, etc.). The system can configure the neural network based on the state information, such as by setting filter lengths or the number of layers based on the spread of eigenvalues and eigenvectors, resulting in more efficient operation and resource utilization as well as higher accuracy compared to conventional ultrasound systems that do not receive the state information of the noise-reduction system and hence are not configured based on state information.

Example System

Figure 1:
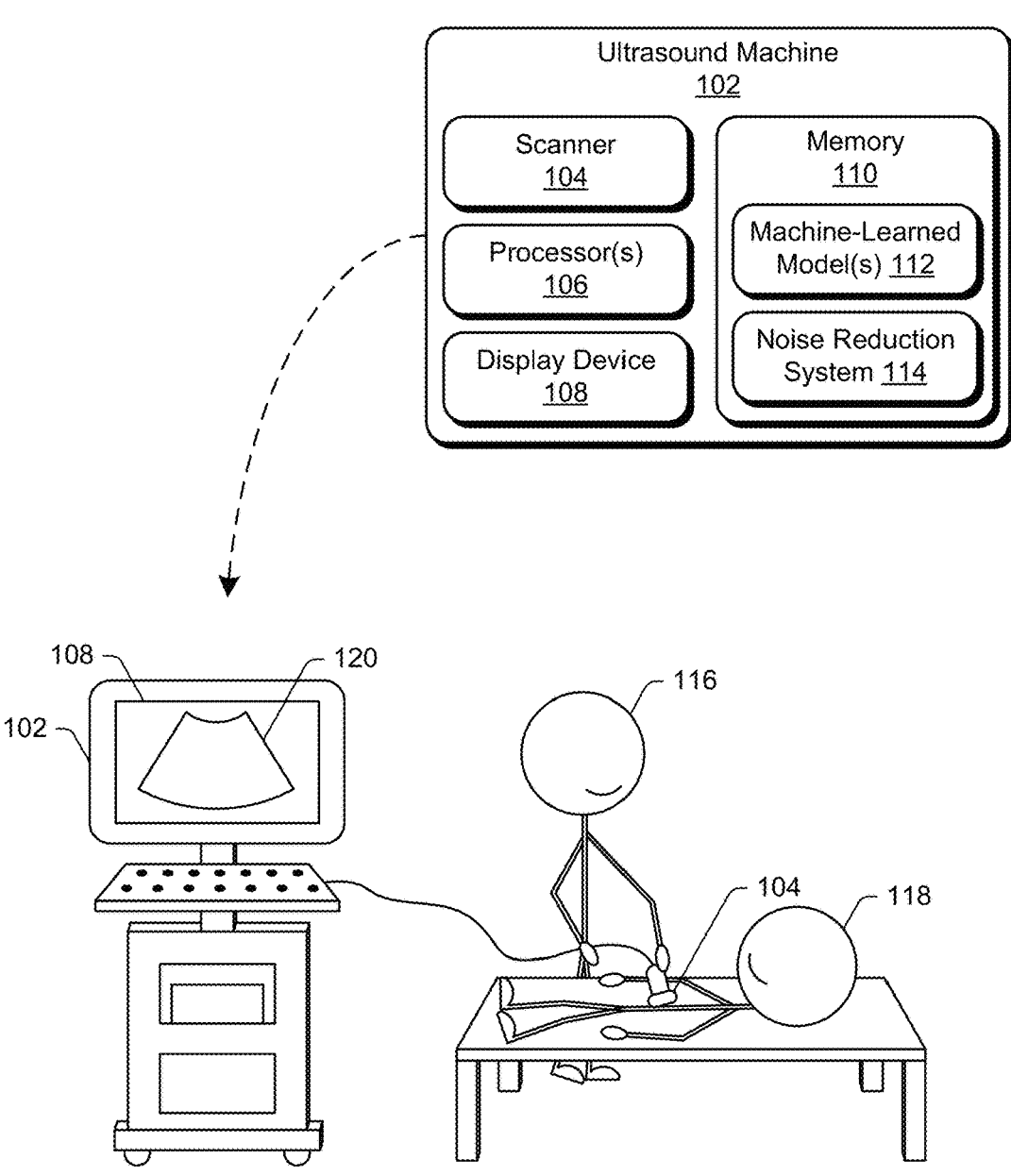
FIG. 1 illustrates an example environment for implementing noise reduction in ultrasound images.

FIG. 1 illustrates an example environment for noise reduction in ultrasound images generated by an ultrasound system 100. Generally, the ultrasound system 100 includes an ultrasound machine 102, which generates data (including images) based on high-frequency sound waves reflecting off body structures. The ultrasound machine 102 includes various components, some of which include a scanner 104, one or more processors 106, a display device 108, and a memory 110. In an example, the display device 108 can include multiple display devices. A first display device can display a first ultrasound image, and a second display device can display a focused ultrasound image or a segmentation image that is generated based on the first ultrasound image. In some implementations, the ultrasound machine 102 also includes one or more machine-learned (ML) models 112 and a noise-reduction system 114 configured to provide input to and/or configure one or more of the ML models 112.

A user 116 (e.g., nurse, ultrasound technician, operator, sonographer, etc.) directs the scanner 104 toward a patient 118 to scan internal bodily structures (e.g., organs, tissues, etc.) of the patient 118 for testing, diagnostic, or therapeutic reasons. In some implementations, the scanner 104 includes an ultrasound transducer array and electronics coupled to the ultrasound transducer array to transmit ultrasound signals to the patient's anatomy and receive ultrasound signals reflected from the patient's anatomy. In some implementations, the scanner 104 is an ultrasound scanner, which can also be referred to as an ultrasound probe.

The display device 108 is coupled to the processor 106, which processes the reflected ultrasound signals to generate ultrasound data. The display device 108 is configured to generate and display an ultrasound image (e.g., ultrasound image 120) of the anatomy based on the ultrasound data generated by the processor 106 from the reflected ultrasound signals detected by the scanner 104. In aspects, the ultrasound data can include data and/or the ultrasound image 120. In some embodiments, the ultrasound data (e.g., the ultrasound image 120 or data representing the ultrasound image 120) is preprocessed by the noise-reduction system 114 to reduce or remove noise from the ultrasound data and thereby normalize the ultrasound data prior to providing the ultrasound data as input to the ML model(s) 112. In this way, the ultrasound system 100 can normalize an image quality and image resolution of the ultrasound data to improve the processing of the ultrasound data by the machine-learned model 112. Further details of these and other features are described below.

Figure 2:
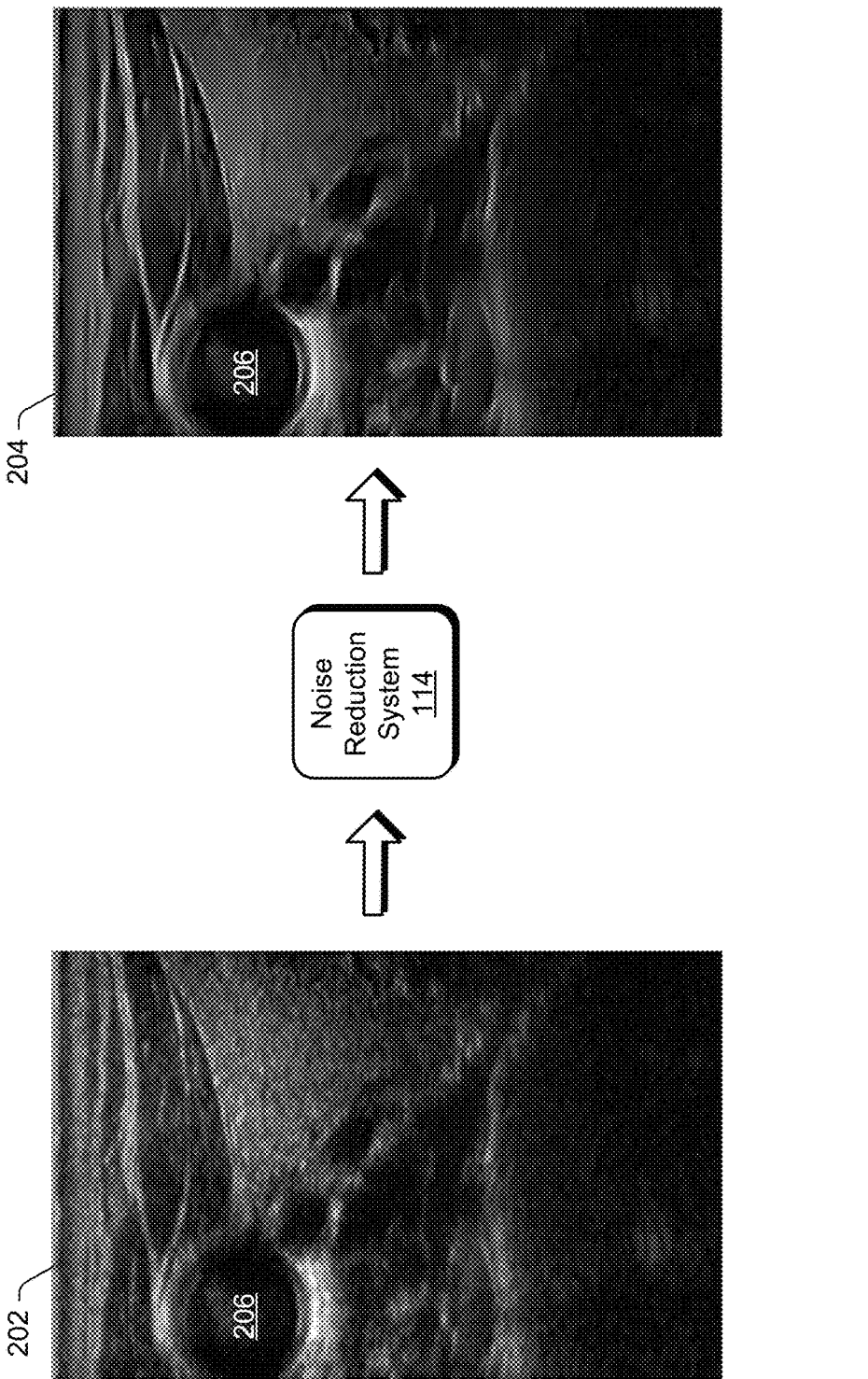
FIG. 2 illustrates an example implementation of a utility of a noise-reduction system from FIG. 1.

FIG. 2 illustrates an example implementation 200 of a utility of the noise-reduction system 114 from FIG. 1. For example, FIG. 2 illustrates a noisy ultrasound image 202, generated by a conventional ultrasound system, and a processed ultrasound image 204 generated by the noise-reduction system 114 described herein. Noise processes have corrupted the ultrasound image 202 so that it includes a significant amount of speckle (or number of speckles) and lacks definition of the borders of a blood vessel 206. Hence, a detection algorithm, such as a neural network or statistical signal processing algorithm, that is implemented to detect and classify the blood vessel 206 can fail.

In contrast, the noisy ultrasound image 202 is processed by the noise-reduction system 114, which outputs the processed ultrasound image 204. In comparison, speckles present in the noisy ultrasound image 202 have been removed from the processed ultrasound image 204, and the borders of the blood vessel 206 in the processed ultrasound image 204 are better defined than the borders of the blood vessel 206 in the noisy ultrasound image 202. Because of the reduction in speckles and the enhanced borders, a detection and classification algorithm that processes the processed ultrasound image 204 is capable of properly detecting and classifying the blood vessel 206, whereas the same detection and classification algorithm that processes the noisy ultrasound image 202 may either not detect the blood vessel 206 at all or misclassify it as an artery when it is a vein (or vice versa).

Figure 3:
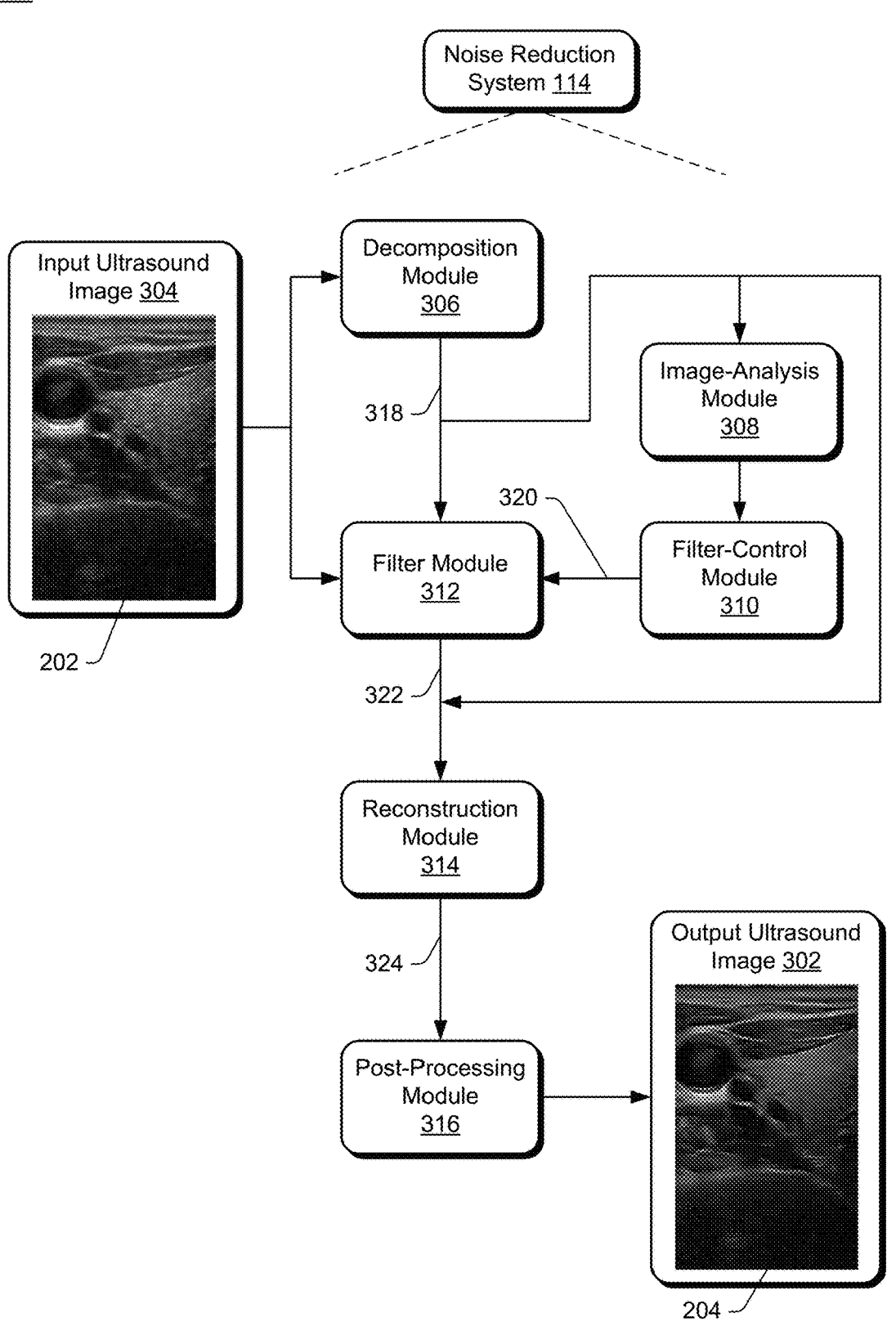
FIG. 3 illustrates an example implementation of the noise-reduction system from FIG. 1.

FIG. 3 illustrates an example implementation 300 of the noise-reduction system 114 from FIG. 1. Here, the noise-reduction system 114 is used to generate an output ultrasound image 302, which may be the processed ultrasound image 204 in FIG. 2, from an input ultrasound image 304, which may be the noisy ultrasound image 202 in FIG. 2. The noise-reduction system 114 includes a decomposition module 306, an image-analysis module 308, a filter-control module 310, a filter module 312, a reconstruction module 314, and a post-processing module 316.

In operation, the input ultrasound image 304 (e.g., the noisy ultrasound image 202) is input to the noise-reduction system 114 and provided to the decomposition module 306 and the filter module 312. The decomposition module 306 decomposes the input ultrasound image 304 into multiple scales or scale images (e.g., by generating multi-scale images from the input ultrasound image 304) having different scales. In an example, the decomposition module 306 includes multiple downsample blocks that progressively downsample the input ultrasound image 304 to generate images at different scales (e.g., sizes), including an image at one-half (½) the size of the input ultrasound image 304, an image at one-quarter (¼) the size of the input ultrasound image 304, and an image at one-eighth (⅛) the size of the input ultrasound image 304. The downsample blocks of the decomposition module 306 can include any suitable circuitry to progressively downsample the input ultrasound image 304, such as a Gaussian pyramid, a Laplacian pyramid, and/or a steerable pyramid that can decompose the image into multiple scales (with or without orientation information).

The image-analysis module 308 receives an output 318 of the decomposition module 306. In an example, the image-analysis module 308 receives an image from the decomposition module 306 that is half the size of the input ultrasound image 304, generated with a downsample-by-two function of the decomposition module 306. The image-analysis module 308 can determine edge properties of an image, such as by constructing structure tensors, gradient information, histograms, and so on. To enhance lines (e.g., edge properties) and suppress noise, the image-analysis module 308 can, for example, implement a decomposition or factorization method, such as an Eigen decomposition or singular value decomposition, and identify regions with edges or noise. The filter-control module 310 can perform Eigenvalue adjustment, singular value adjustment, or remapping to selectively enhance the edges and suppress the noise. In an example, the filter-control module 310 generates histograms of an image to identify a noise threshold. An output 320 of the filter-control module 308 includes a control signal that controls filters of the filter module 312. In an implementation, the filter-control module 310 includes Eigen value adjustment followed by a set of two-dimensional (2D) directional filters. Hence, the filter-control module 310 can generate more robust eigenvalues and corresponding eigenvectors compared with gradient-based methods. In an example, the filter-control module 310 modifies the structure tensor constructed by the image-analysis module 308 to enhance lines and suppress noise and also uses the modified structure tensor to configure filter directions, length, weight, etc. of the filter module 312.

The filter module 312 receives the input ultrasound image 304 and at least one output (e.g., output 318) from the decomposition module 306. In an example, the filter module 312 receives a first output from the decomposition module 306 that includes an image that is half the size of the input ultrasound image 304, as well as a second output from the decomposition module 306 that includes an image that is one-quarter the size of the input ultrasound image 304. The filter module 312 also receives a control signal (e.g., output 320) from the filter-control module 310. The control signal guides directional filtering, diffusion filtering, and/or thresholding on the multi-scale images processed by the filter module 312. In an embodiment, the filter module 312 includes a set of Log-Gabor directional filters, which can be tuned for passband and direction. Depending on computation requirements, 3 to 12 filters tuned for each direction can be applied on the input image (e.g., the input ultrasound image 304, the output 318). For example, three directional filters are 60 degrees apart in angles. Outputs (e.g., filter outputs 322) of the filters of the filter module 312 are provided to the reconstruction module 314.

The reconstruction module 314 receives the filter outputs 322 from the filter module 312 and the output 318 from the decomposition module 306. In an example, the reconstruction module 314 receives an image from the decomposition module 306 that is one-eighth the size of the input ultrasound image 304. The reconstruction module 314 combines the filtered images (e.g., filter outputs 322) from the filter module 312 with at least one multi-scale image (e.g., output 318) from the decomposition module 306 to generate a reconstructed image 324 that is of the same size as the input ultrasound image 304. The reconstruction module 314 can implement a pyramid reconstruction, similar to a pyramid method implemented by the decomposition module 306.

The reconstructed image 324 from the reconstruction module 314 is provided to the post-processing module 316, which can implement any suitable post-processing function (s) to generate the output ultrasound image 302. In an example, the post-processing module 316 sharpens the reconstructed image 324, such as by implementing unsharp masking, grayscale remapping, and the like.

In aspects, the output ultrasound image 302 can be referred to as a de-speckled image and is a normalized version of the input ultrasound image 304. In some aspects, the normalized version is a version of the input ultrasound image 304 that is speckle-free with enhanced major structures. For example, the output ultrasound image 302 is normalized in that certain detail levels of the input ultrasound image 304 are suppressed to create one or more uniform structures in the output ultrasound image 302. Edges can also be sharpened to produce a contrast-enhanced image or a structure-normalized image as the output ultrasound image 302. In aspects, the output ultrasound image 302 is normalized based on at least one of a tuned resolution, noise reduction, or enhanced lines. Such normalization provides an ultrasound image usable with training data without requiring collection of different data from different probes. Then a trained result can be applied to different systems and different probe exams.

The output ultrasound image 302 generated by the noise-reduction system 114 is suitable for further processing by an ultrasound system, such as by a detection algorithm (e.g., an ML model, a neural network, a statistical signal processing algorithm, etc.) that is implemented to detect and classify a bodily structure (e.g., blood vessel, organ, tissue, etc.) or fluid (blood, urine, etc.), segment an anatomy or item of interest (e.g., implant, free fluid, organ, lesion, etc.), and so on from the output ultrasound image 302. In contrast, the input ultrasound image 304 includes a significant amount of noise (e.g., speckles) that can cause the detection algorithm to fail and/or produce erroneous results.

Figure 4:
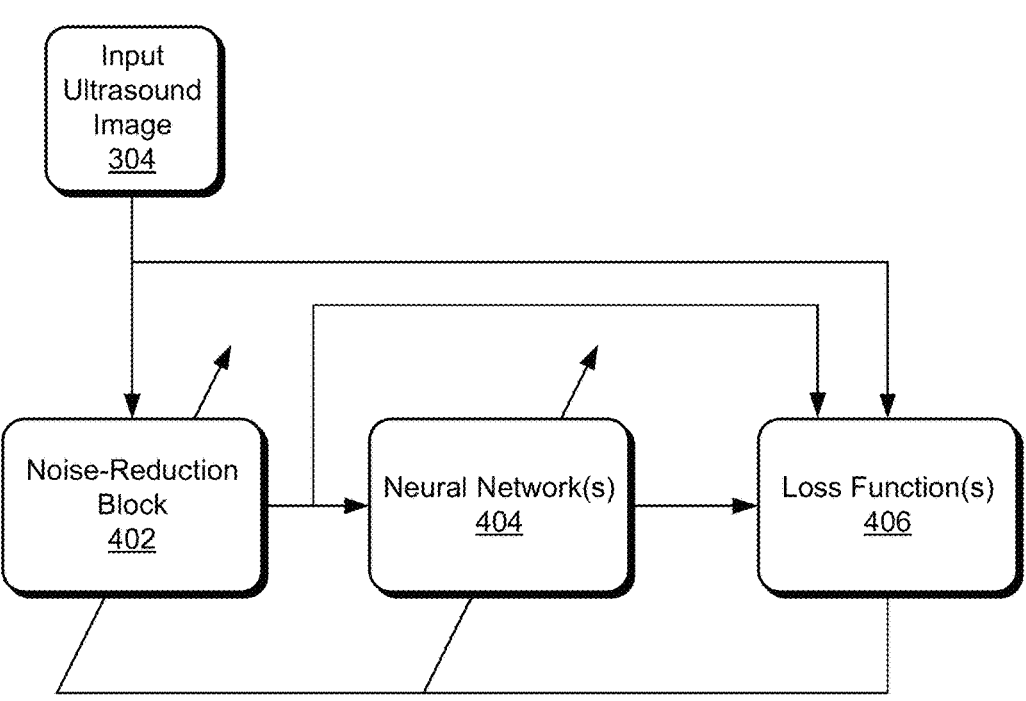
FIG. 4 illustrates components of an ultrasound system, in accordance with one or more implementations.

FIG. 4 illustrates components of an example ultrasound system 400, in accordance with one or more implementations. The example ultrasound system 400 includes a noise-reduction block 402, one or more neural networks 404, and one or more loss functions 406. The ultrasound system 400 is an example of the ultrasound system 100 described above. In addition, the neural network 404 is an example of the machine-learned model 112 described above.

The noise-reduction block 402 receives an ultrasound image, such as the input ultrasound image 304 described above, and can include any suitable processing functions to condition the ultrasound image for processing by the neural network 404. In an example, the noise-reduction block 402 includes or is an example of the noise-reduction system 114. The noise-reduction block 402 generates a de-speckled image, such as the output ultrasound image 302, for processing by the neural network 404. Additionally or alternatively, the noise-reduction block 402 can provide state information to the neural network 404, such as eigenvalues or edge information generated by the image-analysis module 308 of FIG. 3.

The neural network 404 receives data from the noise-reduction block 402, such as a de-speckled ultrasound image (e.g., the output ultrasound image 302), and can be implemented to generate any suitable inference based on the de-speckled ultrasound image. In an example, the neural network 404 can detect an object or anatomy in the de-speckled ultrasound image and label the object or anatomy in the image. Additionally or alternatively, the neural network 404 can segment the object or anatomy and generate a segmentation image. Additionally or alternatively, the neural network 404 can classify the object or anatomy and generate a classification label. The classification label can identify an anatomy type, such as a vein versus an artery, or a left versus right ventricle of a heart.

The loss function 406 can receive any suitable data from components of the ultrasound system 400 and generate a loss term that can be used to update the noise-reduction block 402 and/or the neural network 404, such as by setting a filter coefficient, a filter length, a threshold value, and the like. In an example, the loss function 406 is used to train the neural network 404 based on training images processed by the components of the ultrasound system 400. Additionally or alternatively, the ultrasound system 400 can update, based on the loss function 406, the noise-reduction block 402 and/or the neural network 404 on the fly (e.g., during deployment, such as during an ultrasound examination) using ultrasound images generated from a patient.

In an example, the ultrasound system 400 enables the loss function 406 to update the noise-reduction block 402 and/or the neural network 404 based on an event. One example of an event is a user-selection of an "enable updates" option (e.g., via a user interface of the ultrasound system (not shown)). Another example of an event is a determination of a particular anatomy being imaged. For instance, the ultrasound system 400 can detect an anatomy (e.g., bladder) in an ultrasound image or a user can select an examination preset or type (e.g., a bladder scan), and, based on the anatomy being imaged, the ultrasound system 400 can enable the loss function 406 to update the noise-reduction block 402 and/or the neural network 404. In such an example, the ultrasound system 400 can enable the loss function 406 for a bladder anatomy but not for a blood vessel anatomy. Another example of an event includes a continuous update mode in which the loss function 406 is enabled when the ultrasound system 400 generates ultrasound images.

An embodiment of the ultrasound system 400 includes the noise-reduction system 114 as one example of a noise-reduction block (e.g., the noise-reduction block 402) that preprocesses an ultrasound image (e.g., the input ultrasound image 304) to generate a preprocessed ultrasound image (e.g., the output ultrasound image 302) and provides the preprocessed ultrasound image to the neural network (e.g., the neural network 404).

Generally, neural networks (e.g., deep learning or machine learning) require training on previously acquired ultrasound images. A large variety of data can be needed for the training (e.g., hundreds or thousands of images). If the images are from a different setting (e.g., different manufacturer, different system, different probe, different preset, etc., or even a difficult patient), the resulting accuracy (such as segmentation, object detection, object classification, etc.) will likely decrease significantly. This is because different ultrasound manufacturers, systems, probes, presets, etc. generate ultrasound images with different imaging characteristics such as resolution, contrast, speckle pattern, and signal-to-noise level. To address this issue, conventional approaches collect more images from a new setting for improved learning accuracy, which is typically time-consuming and/or expensive, exacerbating the training effort. The present systems and techniques solve this data requirement issue by preprocessing the ultrasound imaging, prior to training, using the noise-reduction system. Speckle-free or reduced-speckle ultrasound images are created to minimize variations from a manufacturer, system, probe, and/or preset. During a real-time application, noisy images can be preprocessed before running the trained ML model to perform detection, classification, and segmentation of an object in the images. Because the imaging characteristics after the preprocessing are now similar to the trained data, the accuracy can be consistently maintained and kept high. Therefore, the amount of data needed for the training can be reduced compared to conventional systems.

In an example, the preprocessing with the noise-reduction system can be customized based on the frequency and/or bandwidth of the ultrasound signal, output millimeters (mm) per pixel, or type of imaging (e.g., whether or not harmonic imaging is used). This customizability is enabled because these factors determine the resolution of the ultrasound image. If the resolution is high in the input image, the input image can be preprocessed with a lower resolution. If, however, the resolution is low in the input image, the input image can be preprocessed with a higher resolution. Therefore, the speckle-free (or speckle-reduced) output images are similar regardless of their input resolution. Accordingly, tuning the resolution, along with reducing noise and enhancing lines, of the input ultrasound image to create more uniform ultrasound images enables the neural network(s) 404 to properly process the ultrasound images, even when different input ultrasound images are received from different ultrasound probes, different optimization techniques, different examinations (e.g., ultrasound scans) of a patient, different ultrasound settings, etc.

An embodiment includes providing not just a preprocessed ultrasound image (e.g., the output ultrasound image 302) to the neural network 404 as described above but also state information (e.g., state vector) of the noise-reduction block 402 that generated the preprocessed ultrasound image. Examples of state information include eigenvalues (e.g., from the filter-control module 310), a condition number (e.g., a ratio of maximum to minimum eigenvalues), a tensor value (e.g., a maximum output of a tensor function or an argument of a tensor function), an original ultrasound image before noise reduction or removal, a difference between a de-speckled and the original ultrasound image, and the like. Examples of state information that can be passed to the neural networks 404 include, but are not limited to, eigenvalues for each scale, eigenvectors for each scale, directional filtered output along each direction, etc. Both eigenvalues being small, for instance, can indicate a noise region that can provide less weight to the neural network 404. In another example, one of the eigenvalues being significantly larger than the other indicates a boundary that can provide a higher weight for tasks of the neural network 404, such as segmentation. Accordingly, the ultrasound system 400 can include different neural networks 404 to train images with different eigenvalue behaviors. The directional filtered results can also be passed to the neural network 404 since the neural network 404 contains information corresponding to line structures and locations. Such directional filtered results can be useful to the neural network 404 if, for example, border segmentation or line tracking is the primary application of the neural network 404.

The state information is an additional (or secondary) input to the neural network 404 and is an advantage over merely providing an ultrasound image to the neural network 404. For example, the ultrasound system 400 can configure the neural network 404 based on the state information, such as by setting a filter length and/or depth, enabling skip connections, configuring layers of the neural network 404, reduce the complexity of the neural network 404, etc. Hence, when the neural network 404 is provided the state information, the neural network 404 can operate more efficiently and/or generate a better inference (object classification, segmentation, etc.) compared to conventional systems. In addition, the state information augments the input image, which may result in higher accuracy and/or less data required in training compared to conventional systems.

In one example, the ultrasound system 400 selects the neural network 404 from among a plurality of neural networks 404 based on the state information. For instance, if the difference between the maximum eigenvalue and the minimum eigenvalue is below a threshold value (e.g., 0.1, 0.14, 0.2, etc.), a first neural network can be selected. If the difference between the maximum eigenvalue and the minimum eigenvalue is equal to or greater than the threshold value, a second neural network can be selected. The first and second neural networks can be of different architectures, be trained with different training images, have different non-linear functions, have different filter lengths, etc.

Different scales can represent different regions of interest. The ultrasound system 400 can use one neural network on a region of interest in a large-scale ultrasound image (e.g., ⅛ of the imaging size), which corresponds to large-structure detection. The ultrasound system 400 can use another neural network specifically on the region of interest detected above but in a small-scale ultrasound image (e.g., ½ of the imaging size or the full-size image). Hence, the system can reduce a training and detecting time and/or improve accuracy compared to conventional systems.

Example Methods

Figure 6:
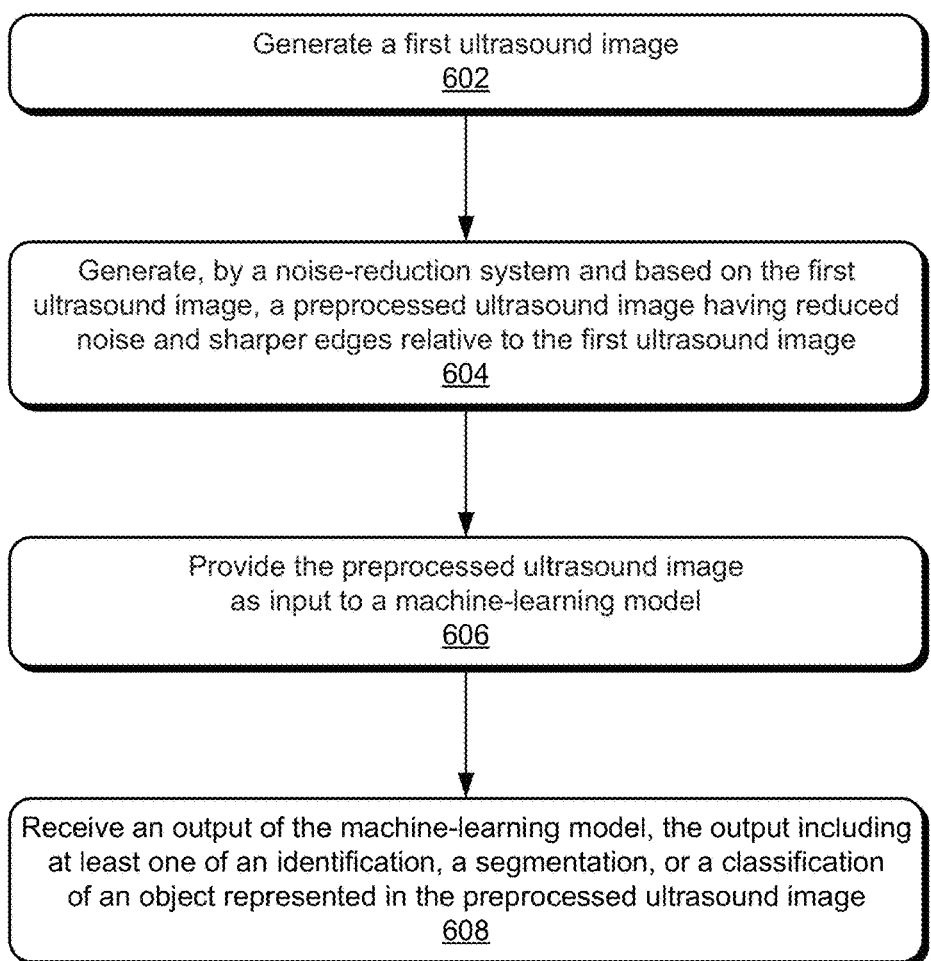
FIG. 6 depicts a method for noise reduction in ultrasound images.

FIGS. 5 and 6 depicts methods 500 and 600, respectively, which are shown as a set of blocks that specify operations performed but are not necessarily limited to the order or combinations shown for performing the operations by the respective blocks. Further, any of one or more of the operations can be repeated, combined, reorganized, or linked to provide a wide array of additional and/or alternate methods. In portions of the following discussion, reference may be made to the example ultrasound system 100 of FIG. 1 or to entities or processes as detailed in FIGS. 2-4, reference to which is made for example only. The techniques are not limited to performance by one entity or multiple entities operating on one device.

FIG. 5 depicts the method 500 for noise reduction in ultrasound images. The method 500 can be performed by an ultrasound system, such as the ultrasound system 100 and/or the ultrasound system 400 described herein. At 502, a first ultrasound image is generated based on ultrasound data generated by an ultrasound scanner using reflections of ultrasound signals transmitted by the ultrasound scanner at an anatomy. For example, the ultrasound system 100 generates the input ultrasound image 304 from reflected ultrasound signals reflecting off bodily structures of a patient. In aspects, the input ultrasound image 304 (e.g., the noisy ultrasound image 202) includes noise in the form of speckles. In an example, the second ultrasound image is a normalized version of the first ultrasound image based on at least one of a tuned resolution, noise reduction, or enhanced lines.

At 504, a second ultrasound image that has less noise than the first ultrasound image is generated based on the first ultrasound image and with a noise-reduction system implemented at least partially in hardware of a computing device. For example, the noise-reduction system 114 is used to reduce or remove the noise from the input ultrasound image 304. The noise-reduction system 114 can reduce the noise by, for example, decomposing the input ultrasound image 304 into multiple scales, filtering the scales, reconstructing filter outputs with the scales, and post-processing to generate the second ultrasound image (e.g., the output ultrasound image 302). In an example, the multiple scales are images that include at least a first scale image and a second scale image, where the first scale image has a first scale and the second scale image has a second scale that is different from the first scale. Further, the second scale image can represent a different region of interest than that of the first scale image. In some aspects, the method 500 can further comprise selecting a first machine-learned model to process the first scale image and selecting a second machine-learned model to process the second scale image. In an example, generating the second ultrasound image includes reducing noise present in the first ultrasound image and sharpening object borders detected in the first ultrasound image.

At 506, state information of the noise-reduction system 114 is determined based on the second ultrasound image being generated. In aspects, the state information represents an internal state of the noise-reduction system when the second ultrasound image is generated. In an example, the ultrasound system 100 or the ultrasound system 400 determines eigenvalues generated when reducing the noise of the first ultrasound image and generating the second ultrasound image. The determined eigenvalues in this example represent the internal state of the noise-reduction system when generating the second ultrasound image from the first ultrasound image. Further, the determined eigenvalues provide an indication as to the parameters and settings used by the ultrasound system to generate the second ultrasound image from the first ultrasound image. As described with respect to FIG. 3, some other example state information determined by the ultrasound system include tensor values, eigenvectors, condition numbers, the first ultrasound image, a difference between the first and second ultrasound images, and the like. The state information is usable to configure a neural network. In some implementations, the ultrasound system can use the state information to configure the neural network. In other implementations, the neural network can use the state information to configure itself. In an example, the set of eigenvalues are usable by the neural network to set a filter length or implement one or more skip connections. The method can also include selecting the machine-learned model from a plurality of machine-learned models based on the state information. In aspects, the machine-learned model includes a neural network. In an example, the state information is appended to a feature map generated by the machine-learned model (e.g., neural network) and used by the machine-learned model as a secondary input.

At 508, at least one of an object identification, an object segmentation, or an object classification is generated with a neural network implemented at least partially in the hardware of the computing device and based on the second ultrasound image and the state information. For example, the neural network 404 uses the second ultrasound image (e.g., the output ultrasound image 302) and the state information corresponding to the generation of the second ultrasound image to identify, segment, and/or classify an object in the second ultrasound image.

FIG. 6 depicts the method 600 for noise reduction in ultrasound images. The method 600 can be performed by an ultrasound system, such as the ultrasound system 100 and/or the ultrasound system 400 described herein. At 602, a first ultrasound image is generated. For example, the ultrasound system 100 generates the input ultrasound image 304 from reflected ultrasound signals reflecting off bodily structures of a patient. In aspects, the input ultrasound image 304 (e.g., the noisy ultrasound image 202) includes noise in the form of speckles.

At 604, a preprocessed ultrasound image having reduced noise and sharper edges relative to the first ultrasound image is generated by a noise-reduction system and based on the first ultrasound image. For example, the noise-reduction system 114 preprocesses the input ultrasound image 304 to reduce or remove noise and sharpen edges (e.g., object borders) depicted in the input ultrasound image 304 and generate a preprocessed ultrasound image (e.g., the output ultrasound image 302). In some implementations, generating the preprocessed ultrasound image includes reducing noise present in the first ultrasound image and sharpening object borders detected in the first ultrasound image. The noise-reduction system can be configured to determine, based on the preprocessed ultrasound image being generated, state information representing an internal state of the noise-reduction system. In aspects, the preprocessed ultrasound image can be generated based on both the first ultrasound image and the state information. Also, the state information can include at least one of one or more eigenvalues, one or more condition numbers, one or more tensor values, the first ultrasound image prior to noise reduction, or a difference between the preprocessed ultrasound image and the first ultrasound image. In an example, the state information includes a set of eigenvalues usable to configure the machine-learned model.

At 606, the preprocessed ultrasound image is provided as input to a machine-learned model. For example, the preprocessed ultrasound image is provided to the machine-learned model 112 (e.g., the neural network 404) for processing. In aspects, the machine-learned model 112 is trained to at least one of identify, segment, or classify an object represented in the preprocessed ultrasound image. In an example, one or more modules implemented by the ultrasound system are configured to select the machine-learned model from a plurality of machine-learned models based on the state information. In another example, the ultrasound system includes the machine-learned model and the machine-learned model includes a neural network. In another example, the one or more modules are further configured to update at least one of the noise-reduction system or the machine-learned model based on a loss function.

At 608, an output of the machine-learned model is received. In aspects, the output includes at least one of an identification, a segmentation, or a classification of an object represented in the preprocessed ultrasound image. For example, the output is received by the ultrasound system 100 or 400 from the machine-learned model 112.

Example Models and Devices

As described, many of the features described herein can be implemented using a machine-learned model. For the purposes of this disclosure, a machine-learned model is any model that accepts an input, analyzes and/or processes the input based on an algorithm derived via machine-learning training, and provides an output. A machine-learned model can be conceptualized as a mathematical function of the following form:

$$f(\hat{s}, \theta) = \hat{y} \qquad \text{Equation (1)}$$

In Equation (1), the operator f represents the processing of the machine-learned model based on an input and providing an output. The terms $\hat{s}$ represents a model input, such as ultrasound data. The model analyzes/processes the input $\hat{s}$ using parameters $\theta$ to generate output $\hat{y}$ (e.g., object identification, object segmentation, object classification, etc.). Both $\hat{s}$ and $\hat{y}$ can be scalar values, matrices, vectors, or mathematical representations of phenomena such as categories, classifications, image characteristics, the images themselves, text, labels, or the like. The parameters $\theta$ can be any suitable mathematical operations, including but not limited to applications of weights and biases, filter coefficients, summations or other aggregations of data inputs, distribution parameters such as mean and variance in a Gaussian distribution, linear algebra—based operators, or other parameters, including combinations of different parameters, suitable to map data to a desired output.

Figure 7:
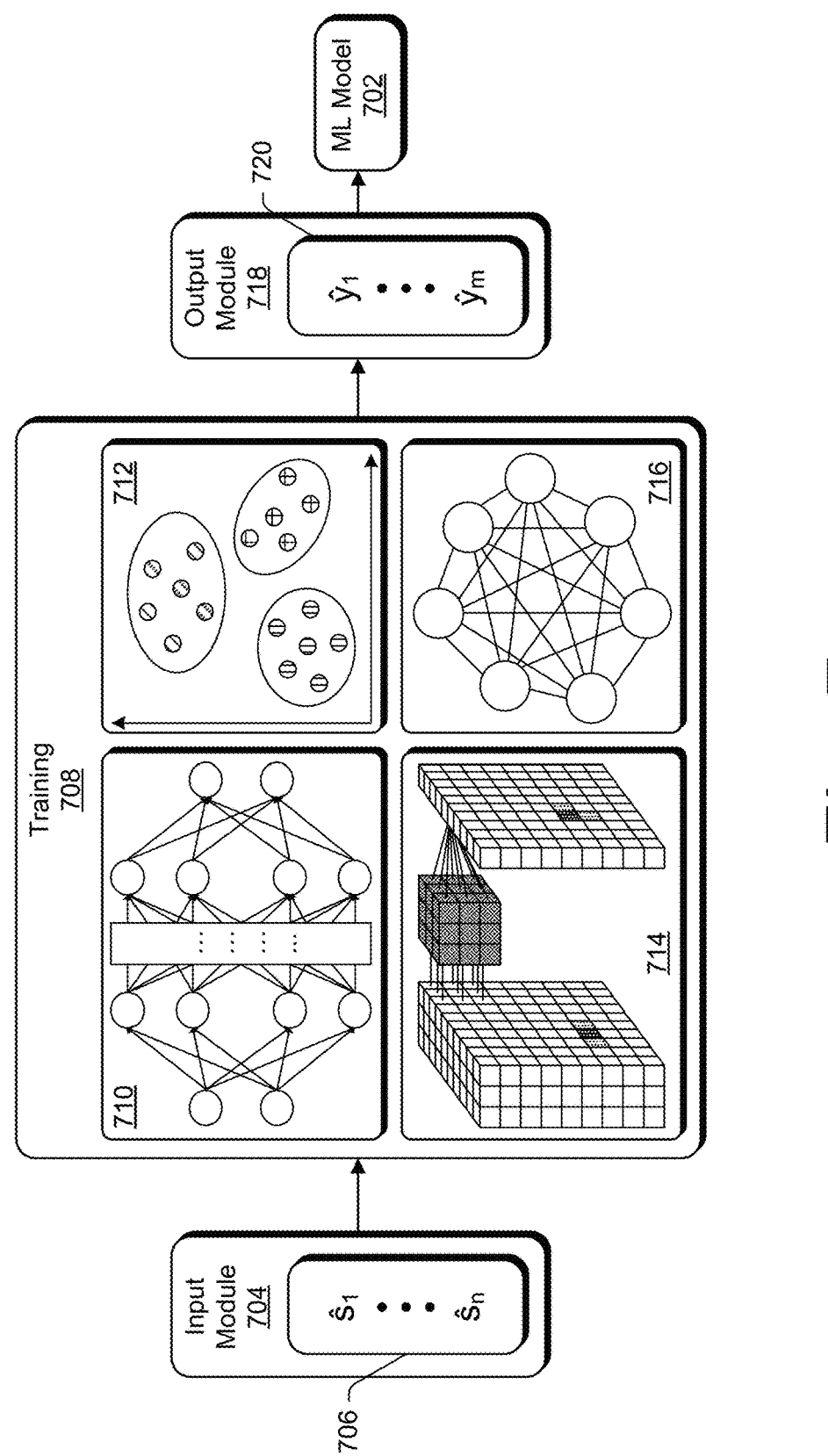
FIG. 7 represents an example machine-learning architecture used to train a machine-learned model.

FIG. 7 represents an example machine-learning architecture 700 used to train a machine-learned model M 702 (e.g., ML model 112). An input module 704 accepts an input $\hat{s}$ 706, which can be an array with members $\hat{s}_1$ through $\hat{s}_n$. The input $\hat{s}$ 706 is fed into a training module 708, which processes the input $\hat{s}$ 706 based on the machine-learning architecture 700. For example, if the machine-learning architecture 700 uses a multilayer perceptron (MLP) model 710, the training module 708 applies weights and biases to the input $\hat{s}$ 706 through one or more layers of perceptrons, each perceptron performing a fit using its own weights and biases according to its given functional form. MLP weights and biases can be adjusted so that they are optimized against a least mean square, logcosh, or other optimization function (e.g., loss function) known in the art. Although an MLP model 710 is described here as an example, any suitable machine-learning technique can be employed, some examples of which include but are not limited to k-means clustering 712, convolutional neural networks (CNN) 714, a Boltzmann machine 716, Gaussian mixture models (GMM), and long short-term memory (LSTM). The training module 708 provides an input to an output module 718. The output module 718 analyzes the input from the training module 708 and provides a prediction output in the form of ŷ 720, which can be an array with members $\hat{y}_1$ through $\hat{y}_m$. The prediction output 720 can represent a known correlation with the input ŝ 706, such as, for example, object identification, segmentation, and/or classification.

In some examples, the input ŷ 706 can be a training input labeled with known output correlation values, and these known values can be used to optimize the output ŷ 720 in training against the optimization/loss function. In other examples, the machine-learning architecture 700 can categorize the output ŷ 720 values without being given known correlation values to the inputs ŝ 706. In some examples, the machine-learning architecture 700 can be a combination of machine-learning architectures. By way of example, a first network can use the input ŝ 706 and provide the prediction output ŷ 720 as an input $\hat{s}_{ML}$ to a second machine-learned architecture, with the second machine-learned architecture providing a final prediction output $\hat{y}_f$. In another example, one or more machine-learning architectures can be implemented at various points throughout the training module 708.

In some ML models, all layers of the model are fully connected. For example, all perceptrons in an MLP model act on every member of ŝ. For an MLP model with a 100×100 pixel image as the input, each perceptron provides weights/biases for 10,000 inputs. With a large, densely layered model, this may result in slower processing and/or issues with vanishing and/or exploding gradients. A CNN, which may not be a fully connected model, can process the same image using 5×5 tiled regions, requiring only 25 perceptrons with shared weights, giving much greater efficiency than the fully connected MLP model.

Figure 8:
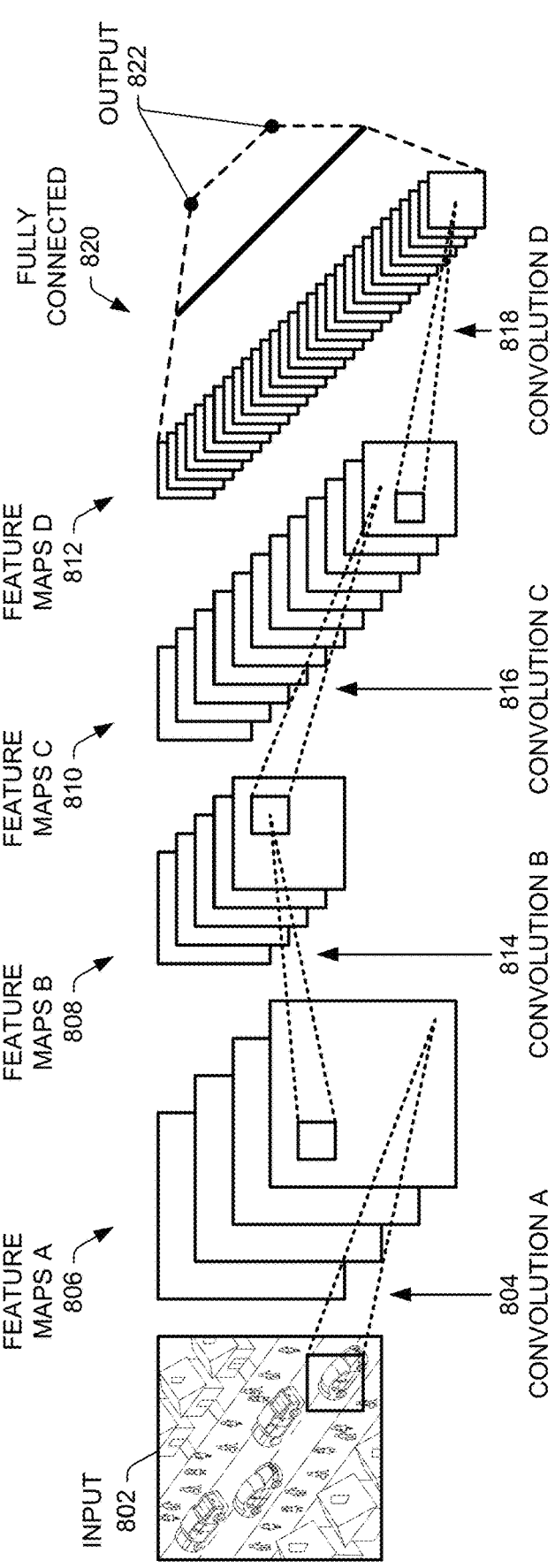
FIG. 8 represents an example model using a convolutional neural network to process an input image, which includes representations of objects that can be identified via object recognition.

FIG. 8 represents an example model 800 using a CNN to process an input image 802, which includes representations of objects that may be identified via object recognition, such as people or cars (or anatomy, as described in relation to FIGS. 1-7). Convolution A 804 may be performed to create a first set of feature maps (e.g., feature maps A 806). A feature map can be a mapping of aspects of the input image 802 given by a filter element of the CNN. This process can be repeated using feature maps A 806 to generate further feature maps B 808, feature maps C 810, and feature maps D 812 using convolution B 814, convolution C 816, and convolution D 818, respectively. In this example, the feature maps D 812 become an input for fully connected network layers 820. In this way, the ML model can be trained to recognize certain elements of the image, such as people or cars, and provide an output 822 that, for example, identifies the recognized elements. In some aspects, the state information from the noise-reduction system 114 can be appended to a feature map (e.g., feature map B 808) generated by the neural network 404 (e.g., CNN). In this way, the state information can be used as a secondary/conditional input to the neural network 404. The state information from the noise-reduction system 114 can be used to set filter length and depth, configure the layers of the deep learning network, reduce the network complexity, etc. The state information can be a controlled, filtered output for a certain layer (e.g., one-fourth of the image, one-eighth of the image). The state information can be an eigenvalue range and/or distribution before or after adjustment. In addition, the state information can be edge information. In another example, the state information can be a difference between major and minor eigenvalues of the structure tensor or the state information can be the structure tensor itself.

Although the example of FIG. 8 shows a CNN as a part of a fully connected network, other architectures are possible and this example should not be seen as limiting. There may be more or fewer layers in the CNN. A CNN component for a model may be placed in a different order, or the model may contain additional components or models. There may be no fully connected components, such as a fully convolutional network. Additional aspects of the CNN, such as pooling, downsampling, upsampling, or other aspects known to people skilled in the art may also be employed.

Figure 9:
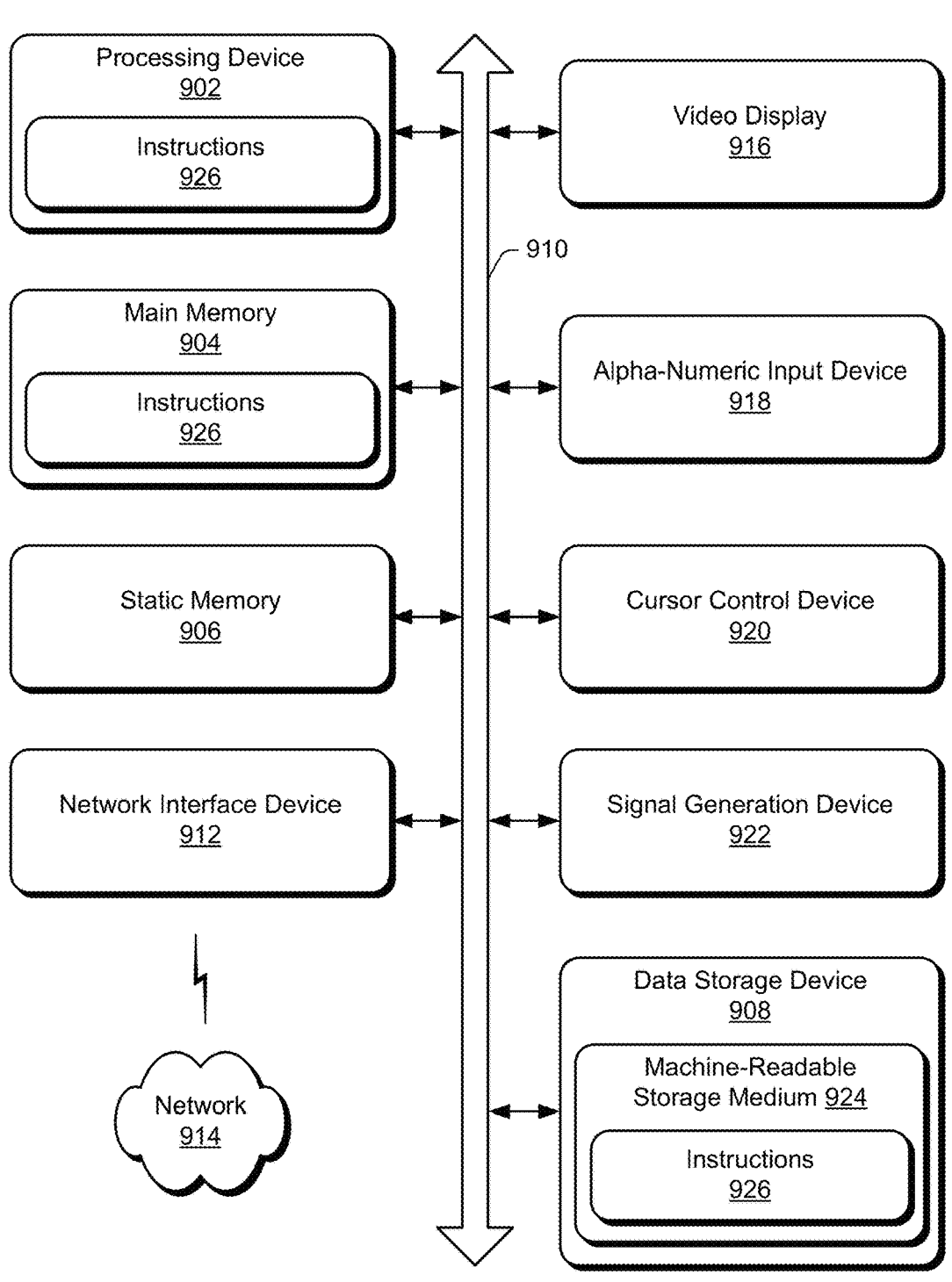
FIG. 9 illustrates a block diagram of an example computing device that can perform one or more of the operations described herein, in accordance with some implementations.

FIG. 9 illustrates a block diagram of an example computing device 900 that can perform one or more of the operations described herein, in accordance with some implementations. The computing device 900 can be connected to other computing devices in a local area network (LAN), an intranet, an extranet, and/or the Internet. The computing device can operate in the capacity of a server machine in a client-server network environment or in the capacity of a client in a peer-to-peer network environment. The computing device can be provided by a personal computer (PC), a server computer, a desktop computer, a laptop computer, a tablet computer, a smartphone, an ultrasound machine, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In some implementations, the computing device 900 is one or more of an ultrasound machine, an access point, and a packet-forwarding component.

The example computing device 900 can include a processing device 902 (e.g., a general-purpose processor, a programmable logic device (PLD), etc.), a main memory 904 (e.g., synchronous dynamic random-access memory (DRAM), read-only memory (ROM), etc.), and a static memory 906 (e.g., flash memory, a data storage device 908, etc.), which can communicate with each other via a bus 910. The processing device 902 can be provided by one or more general-purpose processing devices such as a microprocessor, a central processing unit, or the like. In an illustrative example, the processing device 902 comprises a complex instruction set computing (CISC) microprocessor, a reduced instruction set computing (RISC) microprocessor, a very long instruction word (VLIW) microprocessor, or a processor implementing other instruction sets or processors implementing a combination of instruction sets. The processing device 902 can also comprise one or more special-purpose processing devices such as an application-specific integrated circuit (ASIC), a field programmable gate array (FPGA), a digital signal processor (DSP), a network processor, or the like. The processing device 902 can be configured to execute the operations described herein, in accordance with one or more aspects of the present disclosure, for performing the operations and steps discussed herein.

The computing device 900 can further include a network interface device 912, which can communicate with a network 914. The computing device 900 also can include a video display unit 916 (e.g., a liquid crystal display (LCD), an organic light-emitting diode (OLED), a cathode ray tube (CRT), etc.), an alphanumeric input device 918 (e.g., a keyboard), a cursor control device 920 (e.g., a mouse), and an acoustic signal generation device 922 (e.g., a speaker, a microphone, etc.). In one embodiment, the video display unit 916, the alphanumeric input device 918, and the cursor control device 920 can be combined into a single component or device (e.g., an LCD touch screen).

The data storage device 908 can include a computer-readable storage medium 924 on which can be stored one or more sets of instructions 926 (e.g., instructions for carrying out the operations described herein, in accordance with one or more aspects of the present disclosure). The instructions 926 can also reside, completely or at least partially, within the main memory 904 and/or within the processing device 902 during execution thereof by the computing device 900, where the main memory 904 and the processing device 902 also constitute computer-readable media. The instructions can further be transmitted or received over the network 914 via the network interface device 912.

Various techniques are described in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. In some aspects, the modules described herein (e.g., the noise-reduction system 114, the decomposition module 306, the image-analysis module 308, the filter-control module 310, the filter module 312, the reconstruction module 314, the post-processing module 316, the input module 704, the training module 708, and the output module 718) are embodied in the data storage device 908 of the computing device 900 as executable instructions or code. Although represented as software implementations, the described modules can be implemented as any form of a control application, software application, signal-processing and control module, hardware, or firmware installed on the computing device 900.

While the computer-readable storage medium 924 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that causes the machine to perform the methods described herein. The term "computer-readable storage medium" shall accordingly be taken to include, but not be limited to, solid-state memories, optical media, and magnetic media.

Conclusion

Embodiments of noise reduction in ultrasound images as described herein are advantageous, as they provide for a level of consistency of neural network operation that is generally not possible with conventional ultrasound systems by (i) preprocessing noisy ultrasound images that have been corrupted by various noise processes or that have been generated with different manufacturers' ultrasound machines, probes and exams and (ii) mitigating the noise processes to produce images with consistent characteristics. Providing ultrasound images with consistent characteristics enables the neural networks to generate consistent inferences, thereby improving the workflow for the ultrasound operator. Further, because of the level of consistency of images processed by the noise-reduction system, the neural networks can be trained with fewer training images, which saves time and monetary costs without sacrificing accuracy of results. In addition, adding additional information from the noise-reduction system, such as image eigenvalues, distributions, tensor structures, edge locations in different layers etc., provides more guided information to the neural network, which potentially increases the neural network accuracy and performance.

What is claimed is:

1. A method implemented by a computing device, the method comprising:

generating a first ultrasound image based on ultrasound data, the ultrasound data representing reflections of ultrasound signals transmitted by an ultrasound scanner at an anatomy;

generating, based on the first ultrasound image and by a noise-reduction system implemented at least partially in hardware of the computing device, a second ultrasound image that has less noise than the first ultrasound image;

determining, based on the second ultrasound image generated, state information of the noise-reduction system, the state information representing an internal state of the noise-reduction system and including parameters and settings used by the noise-reduction system to generate the second ultrasound image from the first ultrasound image;

providing the second ultrasound image as a first input and the state information as a secondary input to a machine-learned model implemented at least partially in the hardware of the computing device; and generating, with the machine-learned model and based on the second ultrasound image and the state information, at least one of an identification, a segmentation, or a classification of one or more objects including the anatomy.

2. The method of claim 1, wherein the second ultrasound image is a normalized version of the first ultrasound image based on at least one of a tuned resolution, noise reduction, or enhanced lines.

3. The method of claim 1, wherein the state information includes at least one of one or more eigenvalues, one or more condition numbers, one or more tensor values, the first ultrasound image prior to noise reduction, or a difference between the second ultrasound image and the first ultrasound image.

4. The method of claim 1, wherein generating the second ultrasound image includes decomposing the first ultrasound image into multiple scale images having different scales.

5. The method of claim 4, wherein the state information includes a set of eigenvalues usable to configure the machine-learned model.

6. The method of claim 5, wherein the set of eigenvalues includes one or more eigenvalues for each scale image of the multiple scale images, eigenvectors for each scale image of the multiple scale images, or directional filtered output along each direction.

7. The method of claim 1, wherein the state information is appended to a feature map generated by the machine-learned model and used by the machine-learned model as the secondary input.

8. A method implemented by a computing device, the method comprising:

generating a first ultrasound image based on ultrasound data, the ultrasound data representing reflections of ultrasound signals transmitted by an ultrasound scanner at an anatomy;

generating, based on the first ultrasound image and by a noise-reduction system implemented at least partially in hardware of the computing device, a second ultrasound image that has less noise than the first ultrasound image, wherein generating the second ultrasound image includes:

decomposing the first ultrasound image into multiple scale images having different scales; wherein:

the multiple scale images include at least a first scale image and a second scale image;

the first scale image has a first scale;

the second scale image has a second scale that is different from the first scale; and the second scale image represents a different region of interest than that of the first scale image;

selecting a first machine-learned model to process the first scale image; and selecting a second machine-learned model to process the second scale image;

determining, based on the second ultrasound image generated, state information of the noise-reduction system, the state information representing an internal state of the noise-reduction system; and generating, with a third machine-learned model implemented at least partially in the hardware of the computing device and based on the second ultrasound image and the state information, at least one of an identification, a segmentation, or a classification of one or more objects including the anatomy.

9. The method of claim 1, wherein generating the second ultrasound image includes reducing noise present in the first ultrasound image and sharpening object borders detected in the first ultrasound image.

10. The method of claim 1, further comprising selecting the machine-learned model from a plurality of machine-learned models based on the state information.

11. The method of claim 1, wherein the machine-learned model includes a neural network.

12. The method of claim 1, further comprising configuring the machine-learned model based on the state information.

13. An ultrasound system comprising:

an ultrasound scanner configured to generate ultrasound data, the ultrasound data based on reflections of ultrasound signals transmitted by the ultrasound scanner at an anatomy;

one or more processors configured to generate a first ultrasound image based on the ultrasound data;

a noise-reduction system configured to:

preprocess the first ultrasound image;

generate a preprocessed ultrasound image having reduced noise relative to the first ultrasound image; and determine state information of the noise-reduction system based on the preprocessed ultrasound image generated, the state information including parameters and settings used by the noise-reduction system to generate the preprocessed ultrasound image from the first ultrasound image; and one or more computer-readable media having instructions stored thereon that, responsive to execution by the one or more processors, implement one or more modules, the one or more modules configured to:

provide the preprocessed ultrasound image as input and the state information as secondary input to a machine-learned model implemented at least partially in hardware of the ultrasound system; and obtain an output from the machine-learned model, the output including at least one of an identification, a segmentation, or a classification of an object represented in the preprocessed ultrasound image.

14. The ultrasound system of claim 13, wherein the state information represents an internal state of the noise-reduction system.

15. The ultrasound system of claim 14, wherein the preprocessed ultrasound image is generated based on both the first ultrasound image and the state information.

16. The ultrasound system of claim 14, wherein the state information includes at least one of one or more eigenvalues, one or more condition numbers, one or more tensor values, the first ultrasound image prior to noise reduction, or a difference between the preprocessed ultrasound image and the first ultrasound image.

17. The ultrasound system of claim 14, wherein the state information includes a set of eigenvalues usable to configure the machine-learned model.

18. The ultrasound system of claim 14, wherein the one or more modules are further configured to select the machine-learned model from a plurality of machine-learned models based on the state information.

19. The ultrasound system of claim 13, further comprising the machine-learned model, wherein the machine-learned model includes a neural network.

20. The ultrasound system of claim 13, wherein the one or more modules are further configured to update at least one of the noise-reduction system or the machine-learned model based on a loss function.

\* \* \* \* \*